United States Patent [19]

Betts

[11] 4,199,171
[45] Apr. 22, 1980

[54] MOBILE ARTIST CART

[76] Inventor: Woodrow W. Betts, 5103 Darnell, Houston, Tex. 77096

[21] Appl. No.: 909,828

[22] Filed: May 26, 1978

[51] Int. Cl.² ............................................. A47B 27/14
[52] U.S. Cl. .................................................. 280/652
[58] Field of Search ..................... 280/652, 47.26, 641, 280/645, 47.18; 248/441 R, 441 C, 444, 447–465, 172, 173

[56] References Cited

U.S. PATENT DOCUMENTS

| 2,920,900 | 1/1960 | Best | 280/652 |
| 3,236,536 | 2/1966 | Shore | 280/652 |

Primary Examiner—Robert R. Song
Assistant Examiner—Norman L. Stack, Jr.
Attorney, Agent, or Firm—Bernard A. Reiter

[57] ABSTRACT

A mobile artist cart having a support frame adapted to receive and support an artist's supply cabinet, a handle, a set of support wheels, a set of support legs and a structure for transporting canvas frames along with the other artist's supplies. The artist cart collapses to a folded position for storing or carrying purposes.

11 Claims, 4 Drawing Figures

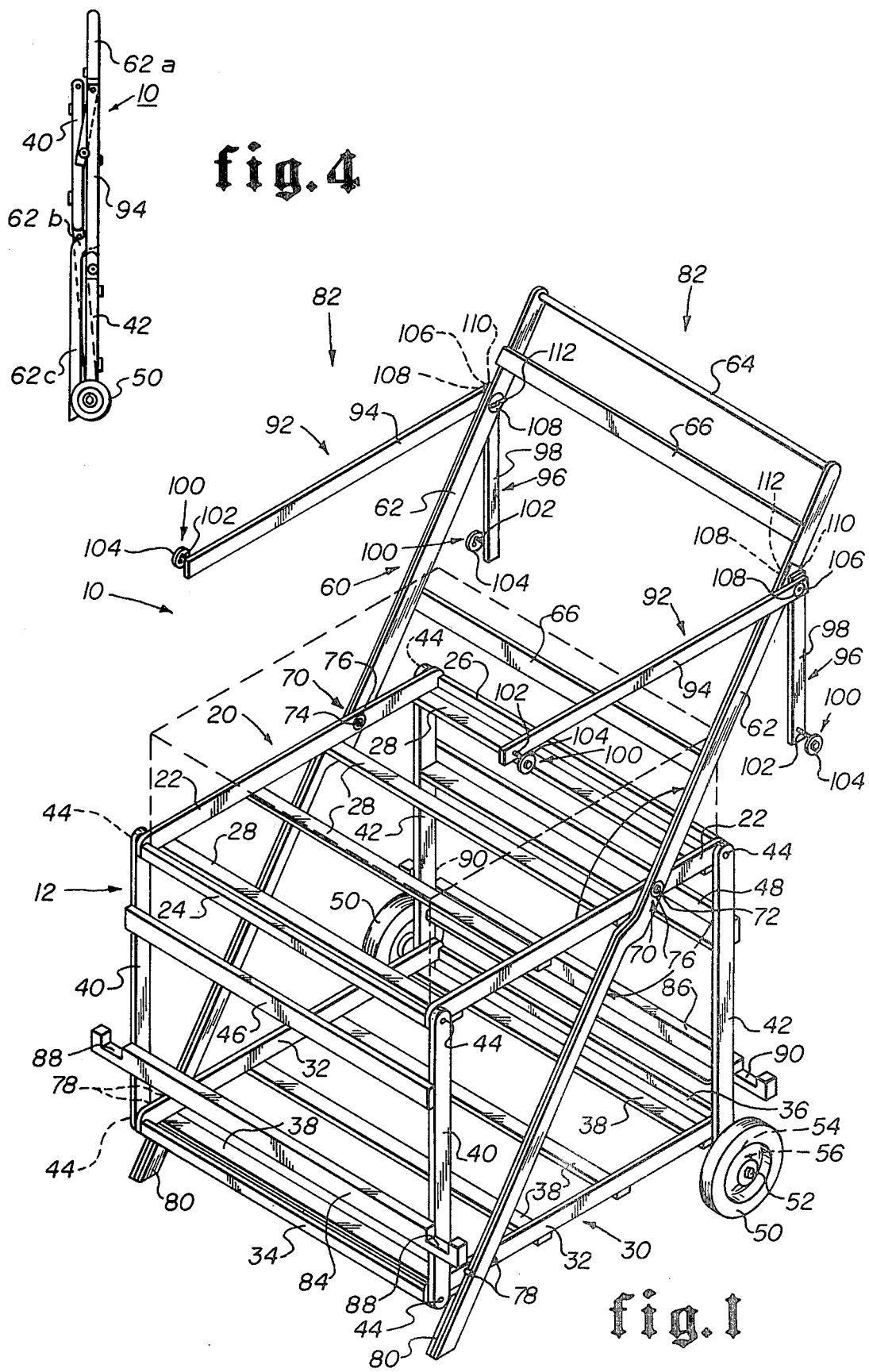

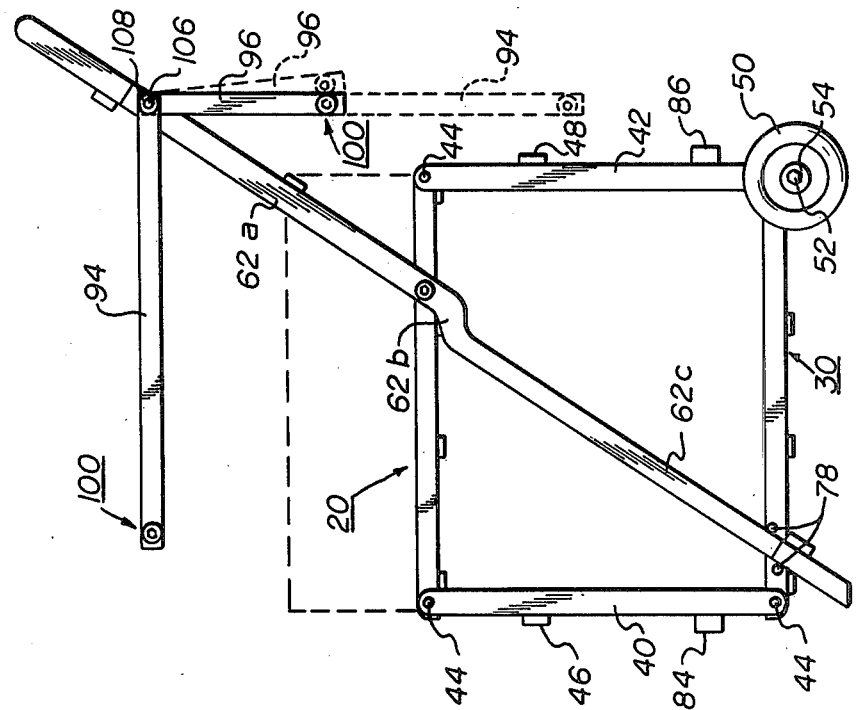
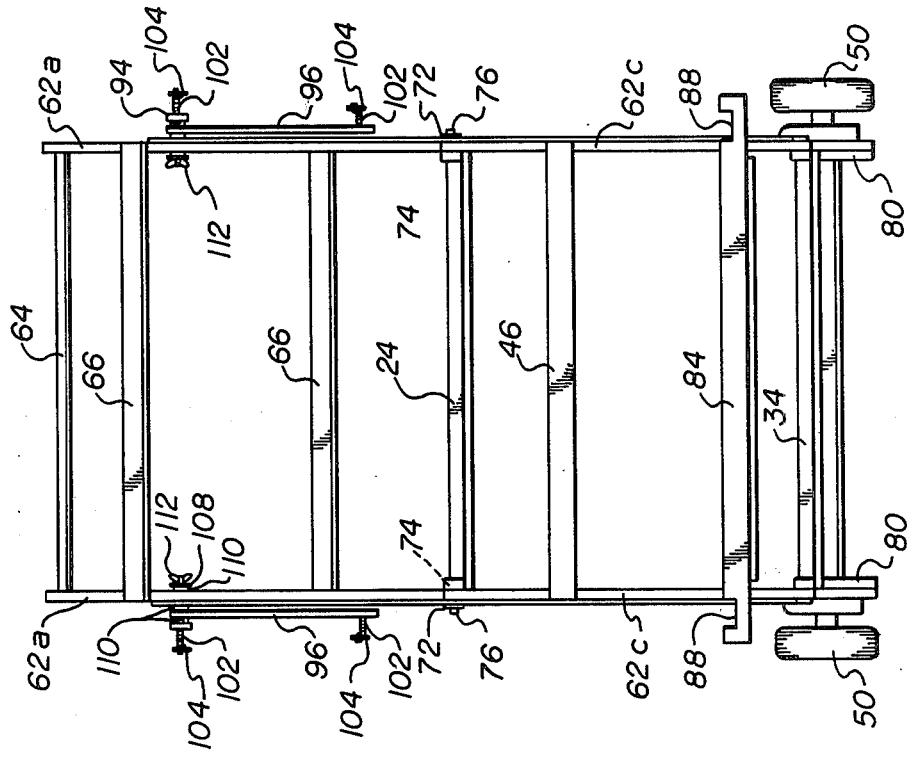

MOBILE ARTIST CART

BACKGROUND OF THE INVENTION

Mobile collapsible carts are well known in this day and age. The mobility requirement is obvious from a study of the application of various mobile carts—shopping carts, laundromat baskets, sidewalk vending carts, etc. Likewise, the folding or collapsing function has been used extensively in mobile carts in order to occupy less space when stored or not in use, as in various designs of grocery carts. Examples of these are Hill, U.S. Pat. Nos. 3,168,328 and 3,388,920. Also, a folded cart is more easily transported or carried about, both by hand and by vehicle or other mode of transporting a cart from one location to another.

Other examples of folding, mobile carts are Osier, U.S. Pat. No. 2,841,409, disclosing a cart for use in the masonry trade to support a mortar board; Livingston, U.S. Pat. No. 2,839,310, disclosing a cart adaptable to a variation of supporting and transporting applications; and Sides, U.S. Pat. No. 2,377,815, disclosing a cart adapted to carry a separate shopping basket.

Heretofore, there has been no application of this mobile, folding principle to a cart designed to transport artist's supplies and canvas frames from one location to another, typically from an automobile to a scenic location along the countryside. In order to accomplish this purpose, the artist cart must necessarily be mobile. Also, it must fold into a substantially planar configuration in order to more easily fit into the trunk or behind the seat of an automobile. In so doing, any collapsible artist cart must fold to a convenient shape, being totally self-contained with no awkward extensions or protruding edges that could damage surroundings or be themselves damaged.

Those familiar with everyday problems encountered by an outdoor artist are aware that artist's canvas frames are extremely delicate and must be treated with great care, especially during the transporting thereof. Prior to the invention herein, there has been no safe method by which an artist's canvas frames could be transported about with the artist's other supplies. The artist either had to make two, sometimes lengthy, trips or had to risk damaging his canvas frames in an attempt to carry all of his supplies in one trip. The cart disclosed herein performs this function quickly, easily and safely and all but eliminates the possibility of damage to the canvas frames during the transporting thereof.

Accordingly, it is an object of the present invention to provide a mobile cart for transporting artist's supplies easily from automobile to the site the artist has chosen to paint.

Further, it is an object of the present invention to provide a mobile artist cart that collapses to an essentially planar configuration having no sharp or protruding edges.

It is a still further object of the present invention to provide a mobile, collapsible artist cart designed to transport canvas frames securely and free from the possibility of rupture or stretching inherent in carrying canvas frames about manually.

In accordance with the invention, a collapsible, mobile artist cart is provided. The cart comprises a frame structure, including upper and lower horizontally disposed support trays. The support trays are interconnected by vertical supports, which pivot relative to the support trays, allowing the frame structure to collapse from its deployed position to a substantially planar configuration for stowing purposes. A handle frame is pivotally mounted to the frame structure in a manner that allows the frame structure to collapse so that the upper and lower support trays, in the planar configuration, "nest" within the essentially linear configuration of the handle frame. The handle frame includes a handle for moving the artist cart about, and also provides stationary feet, enabling the artist cart to sit upright on an essentially horizontal surface. Also included is a set of support wheels by which the mobile art cart may be rolled about.

Means are provided for securely supporting canvas frames during the transporting thereof. This means comprises a set of recesses in corresponding cross members of the support frame for receiving the lower edge of a canvas frame. Sets of rotating arms, pivotally mounted to the handle frame, operate the engage the canvas frame upper edge and retain the canvas frame in its lower recesses as the canvas frame and other artist's supplies are transported about.

BRIEF DESCRIPTION OF THE DRAWINGS

Other objects and advantages of the invention will become apparent upon a careful reading of the following detailed description of the invention, the claims and the drawings, in which like reference characters are used throughout to denote like parts in the several views, wherein:

FIG. 1 is an isometric view of the mobile artist cart in its deployed position.

FIG. 2 is a front view of the mobile artist cart in its deployed position.

FIG. 3 is a side view of the mobile artist cart in its deployed position.

FIG. 4 is a side view of the mobile artist cart shown in its folded position.

While the invention will be described in connection with a preferred embodiment, it will be understood that it is not intended to limit the invention to that embodiment. On the contrary, it is intended to cover all alternative modifications and equivalents as maybe included in the spirit and scope of the invention as defined by the appended claims.

DETAILED DESCRIPTION OF THE INVENTION

Referring now to the drawings, the mobile artist cart, generally illustrated at 10, comprises a frame structure 12 including upper and lower horizontally disposed support trays 20 and 30, respectively, and front and rear tray support means 40 and 42 for the upper tray; a handle structure, generally illustrated at 60, including a handle 64 for actuating movement of the artist cart; means 82 for supporting and retaining canvases; and means 50 for mobilizing the artist cart. All major components of the unit, excluding the wheels 50, may be made of wood, as in the preferred embodiment, of lightweight metal, or any combination thereof.

As best shown in FIG. 1, the upper tray 20 comprises side walls 22, a front wall 24, a rear wall 26 and a plurality of support slats 28 which form the bottom of the upper tray 20. These members are permanently bonded together to form a structurally rigid support tray. The lower tray 30 is essentially identical to the upper tray 20 and comprises side walls 32, a front wall 34, a rear wall 36 and a plurality of support slats 38 which form the bottom of the tray 30. As in the upper tray 20, the individual members of the lower tray 30 are permanently bonded together to form a structurally rigid support tray.

The upper tray 20 is disposed directly above the lower tray 30 when the cart is upright in its deployed position. In the preferred embodiment, the two trays are held in position by front and rear tray support members 40 and 42 pivotally connected thereto at each corner thereof by means of dowel pins 44. Each tray support member 40 and 42 pivotally connects at its respective upper end a respective corner of the upper support tray 20, and pivotally connects at its respective lower end a respective corner of the lower support tray 30. In this manner, the upper and lower trays 20 and 30, respectively, are pivotally connected at corresponding corners to enable the support trays to move relative to each other, rotating about the dowel pin pivot points, yet always remaining parallel to one another as the device is being folded and/or unfolded for storing or for using.

Permanently mounted to the front tray supports 40 are a plurality of front cross support braces 46 which add rigidity to the structure and prevent any lateral or transverse movement thereof. Similarly, permanently mounted to the rear tray supports 42 are a plurality of rear cross support braces 48 which function in the same manner as the front support braces 46.

As shown in the drawings, the preferred embodiment includes left and right support wheels 50 rotatably mounted on the lower end of the rear tray supports 42, respectively, by means of a wheel bolt 52, flat washers 54 and nut 56. The wheels 50 may be, but need not necessarily be, on a continuous axle. In the preferred embodiment, the axis of rotation of the wheels 50 is located below the pivot point connection or the rear tray support members 42 to the lower support tray 30. As will be explained hereinbelow, this location of the axis of rotation of the wheels 50 allows the unit to be tilted rearwardly for ease in maneuvering the mobile cart about.

As best shown in FIG. 1, a handle structure, generally illustrated at 60, is provided and serves a multiplicity of functions, to be described hereinbelow. The handle structure 60 includes laterally spaced essentially longitudinal handle frame members 62 pivotally connected to side walls 22, respectively, of the upper support tray 20. The handle frame members 62 are connected at their respective upper ends by a handle 64 which allows the mobile cart to be maneuvered about on its wheels 50. The handle structure 60 includes a plurality of cross braces 66 connecting handle frame members 62 in a manner to insure rigidity and structural stability to the handle structure 60, and also to maintain the handle frame members 62 equidistant along their length.

As best shown in FIG. 3, handle frame members 62 are substantially straight, but include upper linear sections 62a and lower linear sections 62c connected by third transition sections 62b. In each handle frame member, the axes of symmetry of the upper "a" section and the lower "c" section are parallel and separated by a distance sufficient to enable a tray support member 40 and 42 to "nest" adjacent the first end section of the handle frame member and align its linear axis of symmetry with that of the second section of the handle frame member when the cart is in its folded position as depicted in FIG. 4.

The handle structure 60 is pivotally mounted to the support frame 12 at axially aligned pivot points 70 using bolts 72, locknuts 74 and flat washers 76. Locknuts 74 are tightened snugly to bolts 72 to remain intact, yet allow freedom of rotation of the handle structure 60 relative to support frame 12.

As shown in FIGS. 1 and 3, the preferred embodiment includes sets of guide pins 78 permanently mounted to the lower support tray side walls 32. These guide pins 78 operate to retain and guide the lower handle frame member section 62c in a linear path as the cart is folded and unfolded to its deployed position.

Means 80 are provided for limiting the linear travel of the handle frame members 62 along the lower support tray 30. These legs 80 are permanently affixed to the lower "c" section of handle frame members 62 to preclude further travel thereof once the cart 10 is fully unfolded into its deployed position. These legs 80 also are the front supports on which, in conjunction with the rear wheels 50, the cart 10 sits upright.

As shown in the drawings, the collapsible, mobile cart includes a means 82 for supporting and retaining a plurality of canvas frames. In the preferred embodiment, this means 82 includes front and rear cross brackets 84 and 86 permanently mounted on the lower edges of respective front and rear surfaces of the support frame 12. The canvas frame supporting cross brackets 84 and 86 each include vertically open front and rear canvas recesses 88 and 90, respectively, each recess being located immediately outboard of the support frame 12 and the handle structure 60. In this manner, a canvas frame may be placed in the recesses 88 and 90 on either side of the support frame 12 in order that such canvas frame may be transported about.

Located near the top of each handle frame member 62 and rotatably mounted thereto are sets (one set per handle frame member) of canvas frame retaining means 92 and 96. Each set includes a first retaining arm 94 and a second retaining arm 98. Each canvas frame retaining arm 94 and 98 includes an adjustable or spring means 100 for engaging and retaining the canvas frame along its upper and/or rear surfaces when such canvas frame is placed in the lower canvas frame retaining recesses 88 and 90. As shown in FIGS. 1 and 2, this spring means 100 for retaining canvas frames includes a tension spring 102 located at the free end of each retaining arm 94 and 98 and oriented with its central axis normal to the plane of a canvas frame placed in the canvas frame retaining recesses 88 and 90. Attached to this tension spring 102 is a large flat washer 104, the plane of the flat washer being parallel to the plane of the canvas frame. As shown in the drawings, the retaining arms 94 and 98 are pivotally mounted to the handle frame members 62 to rotate in planes parallel to that of a canvas frame placed within the canvas frame recesses 88 and 90. In the preferred embodiment, both the first and second retaining arms 94 and 98 are attached to the handle frame member 62 using a bolt 106, a series of metal flat washers 108, a series of rubber flat washers 110 and a "wing"-nut 112. In this manner, the retaining arms 94 and 98 may freely rotate about to engage the upper and rear surfaces of a canvas frame positioned within the retaining recesses 88 and 90. The adjustable retaining means 100, comprising tension spring 102 and metal flat washer 104 are positioned about the canvas frame in a manner to hold the canvas frame securely in the lower recesses 88 and 90. The "wing" nut 112 may now be tightened securely to insure that the retaining arms 94 and 98 remain in position to retain the canvas frame in place as the cart is wheeled about.

In operation, the mobile cart 10 is removed from its storing location (in folded position as shown in FIG. 4) and is unfolded as follows: (1) the operator stands the cart upright and leans it rearward slightly; (2) with one hand, he grasps the handle 64 of the cart 10, and with his other hand grasps the front wall 24 of the upper tray 20; (3) he now separates the members held in each hand while exerting a slight downward pressure on each member 62 and 24. The lower portions of the handle frame members 62c are allowed to slide along a linear path determined by the location of the guide pins 78 until the side walls 32 of the lower tray 30 come to rest on the legs 80 of the lower handle frame members 62c. The operator now tilts the mobile cart 10 forward using the handle 64, and allows the cart to come to rest on the wheels 50 and the legs 80.

The upper basket 20 is designed to receive an artist's supply cabinet (shown in ghost) such cabinet designed to contain the artist's paints, thinner, brushes, etc. The cabinet is of a size and shape to rest securely on the plurality of slats 28 of the upper basket 20 and is held securely in place by the side walls 22 and front and rear walls 24 and 26.

The mobile cart 10 is designed to accept and transport a plurality of canvas frames along with the artist's supply cabinet. Typically, a canvas frame is placed in recesses 88 and 90 of the canvas frame support brackets 84 and 86. The canvas frame retaining arms 94 and 98 are then rotated about until their respective tension springs 102 and metal flat washers 104 engage the periphery of the canvas frame along its upper and rear edges. With the canvas frame firmly in place, "wing"-nut 112 may now be tightened by hand to insure that such canvas frames will be held securely in place as the mobile artist cart is wheeled about over hill and dale. To remove the canvas frames, the reverse process is employed, i.e. "wing"-nut 112 is loosened, retaining arms 94 and 98 are rotated free of the canvas frame periphery and the canvas frame is removed from the mobile cart.

To collapse the mobile cart 10 into its folded position as depicted in FIG. 4 (the artist's supply cabinet and all canvas frames having been first removed), the operator should: (1) align the canvas frame retaining arms 94 and 98 with the handle frame members 62 and tighten the "wing"-nuts 112 securely; (2) tilt the mobile cart 10 rearward slightly; (3) grasp the handle 64 of the cart 10 with one hand; (4) grasp the front wall 24 of the upper tray 20 with the other hand; and (5) pull both members 64 and 24 together until the mobile cart 10 is fully collapsed into its folded position as depicted in FIG. 4. It should be noted that, in the preferred embodiment, when the mobile cart 10 is in its folded position, the handle frame members 62 extend beyond the wheels 50. This enables the folded mobile cart 10 to stand upright while leaning against a wall, etc. with no possibility of rolling away on its own, because, with the cart standing upright, its wheels 50 are off the ground.

From the foregoing it will be seen that this invention is one well adapted to attain all the ends and objects hereinabove set forth together with other advantages which are obvious and which are inherent to the apparatus.

It will be understood that certain features and subcombinations are of utility and may be employed with reference to other features and subcombinations. This is contemplated by and is within the scope of the claims.

As many possibly embodiments may be made of the invention without departing from the scope thereof, it is to be understood that all matter herein set forth or shown in the accompanying drawings is to be interpreted as illustrative and not in a limiting sense.

The invention having been described, what is claimed is:

1. In a collapsible, portable, mobile cart for carrying and transporting a cargo and canvas frames, comprising:
   a support frame for receiving and supporting a cargo, having
      upper and lower support trays disposed substantially parallel to each other when said cart is in its deployed position, a set each of forward and rear tray support members connecting said upper and lower trays, and
      a set of support wheels mounted at the lower portion of said support frame to enable rolling movement of said cart; and
   a handle structure for maneuvering said cart, having laterally spaced handle frame members connected to said support frame,
      a handle for maneuvering said cart, and
      legs for supporting said cart;
   the improvement comprising:
      a set of laterally spaced canvas frames supporting means having
         front and rear recesses for accepting therein canvas frames, and
      a canvas frame retaining means having first and second retaining arms, each pivotally mounted to said handle frame member so as to rotatably engage the upper surface of the canvas frame and retain same in said canvas frame recesses during transporting thereof.

2. The cart according to claim 1, wherein said handle frame members each contain first, second and third sections, said first and third sections being linear and parallel to each other, and offset from each other by said second section, for enabling said tray support members to rest adjacent and parallel to said first and third sections when said cart is in its folded position.

3. The cart accordingly to claim 1, wherein said support frame includes guiding and retaining means for retaining said handle frame members in sliding communication therewith as said cart is transformed to and from its folded and deployed positions.

4. The cart according to claim 1, wherein said support frame defines a rectangular box when said cart is in its deployed position, said upper support tray adapted to receive and support a removable cargo to be transported about by said cart.

5. The cart according to claim 1, wherein each of said retaining arms includes at the free end an adjustable means for engaging and retaining canvas frames of varying thicknesses during transporting thereof.

6. A collapsible, portable, mobile cart for carrying and transporting a cargo and canvas frames comprising:
   a support frame for receiving and supporting a cargo, having
      upper and lower support trays disposed substantially parallel to each other when said cart is in its deployed position,
      a set each of forward and rear tray support members pivotally connected at each end to said upper and lower support trays to enable said trays to move relative to each other, rotating about the pivot connection, yet remaining parallel to each other, and a set of laterally spaced support wheels rotatably mounted at the lower portion of said support frame to enable rolling movement of said cart;

a handle structure for maneuvering said cart, having laterally spaced handle frame members connected to said support frame, a handle for maneuvering said cart, and legs for supporting said cart; and p1 a set of laterally spaced canvas frame supporting means, having front and rear recesses for accepting therein canvas frames, and upper canvas frame retaining means for supporting the upper portion of the canvas frames during transporting thereof.

7. The cart according to claim 6, wherein said handle frame members each contain first, second and third sections, said first and third sections being linear and parallel to each other, and offset from each other by said second section, for enabling said tray support members to rest adjacent and parallel to said first and third sections when said cart is in its folded position.

8. The cart according to claim 6, wherein said support frame includes guiding and retaining means for retaining said handle frame members in sliding communication therewith as said cart is transformed to and from its folded and deployed positions.

9. The cart according to claim 6, wherein said support frame defines a rectangular box when said cart is in its deployed position, said upper support tray adapted to support a removable cargo to be transported about by said cart.

10. The cart according to claim 6, wherein said canvas frame retaining means includes first and second retaining arms, each pivotally mounted to said handle frame member so as to rotatably engage the upper surface of the canvas frame and retain same in said canvas frame recesses during transporting thereof.

11. The cart according to claim 10, wherein each of said retaining arms includes at the free end an adjustable means for engaging and retaining canvas frames of varying thicknesses during transporting thereof.

* * * * *